United States Patent
Kiel

(10) Patent No.: US 7,527,758 B2
(45) Date of Patent: May 5, 2009

(54) METHODS AND APPARATUS FOR MANUFACTURING A DIFFUSION-TIGHT PLASTIC CONTAINER

(75) Inventor: Hans-Richard Kiel, Oyten (DE)

(73) Assignee: MARS Incorporated, McLean, VA (US)

( * ) Notice: Subject to any disclaimer, the term of this patent is extended or adjusted under 35 U.S.C. 154(b) by 0 days.

(21) Appl. No.: 10/470,544

(22) PCT Filed: Feb. 8, 2002

(86) PCT No.: PCT/EP02/01342

§ 371 (c)(1),
(2), (4) Date: Nov. 4, 2003

(87) PCT Pub. No.: WO02/062552

PCT Pub. Date: Aug. 15, 2002

(65) Prior Publication Data

US 2004/0067344 A1    Apr. 8, 2004

(30) Foreign Application Priority Data

Feb. 8, 2001   (DE) ................................ 101 05 699

(51) Int. Cl.
B29C 45/14 (2006.01)
(52) U.S. Cl. ..................... 264/268; 264/266; 264/267; 264/265; 428/35.7; 428/35.8; 428/36.7; 220/633; 220/626; 220/608
(58) Field of Classification Search ................. 428/35.7, 428/35.8, 36.7; 264/265, 268, 267, 266; 220/633, 626, 608
See application file for complete search history.

(56) References Cited

U.S. PATENT DOCUMENTS

| 4,076,790 A | 2/1978 | Lind |
| 6,286,705 B1 * | 9/2001 | Mihalov et al. .......... 220/359.3 |

FOREIGN PATENT DOCUMENTS

| EP | 0 492 052 A2 | 7/1992 |
| EP | 0 492 052 B1 | 7/1992 |
| FR | 2651460 A1 | 3/1991 |
| JP | 03021414 | 1/1991 |
| JP | 05301249 | 11/1993 |
| JP | 08244067 | 9/1996 |
| JP | 11314622 | 11/1999 |

* cited by examiner

*Primary Examiner*—William P Watkins, III
(74) *Attorney, Agent, or Firm*—Fulbright & Jaworski, LLP

(57) ABSTRACT

A method of manufacturing a diffusion-tight plastic container with a bottom portion and a side wall portion, comprising the steps of: a) providing a planar, diffusion-tight film material, b) cutting a label out of the film material, the label having a bottom portion corresponding to the bottom portion of the plastic container and at least one side tab extending from it, corresponding to the side wall portion of the plastic container, c) preshaping the label in accordance with an outer surface of the plastic container, thereby forming overlapping areas, d) sealing the film material at the overlapping areas, as a result of which the label is shaped into the form of the film material body, e) placing the label into a mould having an inner surface corresponding to the outer surface of the plastic container to be manufactured, f) closing the mould, thus forming a mould cavity, the thickness of which corresponds to the thickness of the plastic container, and g) injecting plastic into the mould cavity and manufacturing the plastic container, whereby the label is bonded integrally to the plastics material and forms the outer surface of the plastic container.

8 Claims, 3 Drawing Sheets

(Detail X)

METHODS AND APPARATUS FOR MANUFACTURING A DIFFUSION-TIGHT PLASTIC CONTAINER

This application is a national stage application of PCT/EP02/01342 filed Feb. 8, 2002, claiming priority to DE 101 05 699.0 filed Feb. 8, 2001.

TECHNICAL FIELD

The invention relates to a method of manufacturing a diffusion-tight plastic container and a label for use in the context of the invention.

BACKGROUND OF THE INVENTION

In the manufacture of known diffusion-tight plastic containers, especially in the food and animal food sector, plastic containers which have been manufactured in a manner known per se are provided with an inner or outer layer of diffusion-tight material, such as aluminium foil, which can at the same time serve as a substrate for printing on.

The problem of the invention consists in providing a method and an apparatus by means of which diffusion-tight plastic containers can be manufactured with a smaller number of steps and in better quality than hitherto.

BRIEF SUMMARY OF THE INVENTION

This problem is solved in accordance with the invention by a method of manufacturing a diffusion-tight plastic container with a bottom portion and a side wall portion, comprising the steps of: a) providing a planar, diffusion-tight film material, b) cutting a label out of the film material, the label having a bottom portion corresponding to the bottom portion of the plastic container and at least one side tab extending from it, corresponding to the side wall portion of the plastic container, c) preshaping the label in accordance with an outer surface of the plastic container, thereby forming overlapping areas, d) sealing the film material at the overlapping areas, as a result of which the label is shaped into the form of a film material body, e) placing the label into a mould having an inner surface corresponding to the outer surface of the plastic container to be manufactured, f) closing the mould, thus forming a mould cavity, the thickness of which corresponds to the thickness of the plastic container, and g) injecting plastics material into the mould cavity and manufacturing the plastic container, whereby the label is bonded integrally to the plastics material and forms the outer surface of the plastic container.

It can also be provided for the label to be deformed at least in parts in a deep-drawing like manner before, at the same time as or after step d), whereby it is given a three-dimensional curvature in accordance with the outer surface of the plastic container.

In the process, it is preferably envisaged that the label is deformed at least in parts in a deep-drawing like manner in the mould by the injected plastics material, whereby it is given a three-dimensional curvature in accordance with the outer surface of the plastic container.

The label can have a plurality of side tabs and can be deformed in a deep-drawing like manner especially in corner regions of the plastic container. It can also be provided for the corner regions of the label to be rounded off or for the corner regions of the plastic container to be manufactured to be rounded off.

It is useful for a circumferential sealing edge to be formed on the plastic container (and the label), which can be provided with a marginal, plastic bead.

The problem according to the invention is further solved by a label for use in the manufacture of a diffusion-tight plastic container which, in accordance with an outer surface of the plastic container is preformed from a planar, diffusion-tight film material having a bottom portion corresponding to a bottom portion of the plastic container and at least one side tab corresponding to a side wall portion of the plastic container, the film material having overlapping regions at which it is sealed, and said label being deformed at least in parts in a deep-drawing like manner and having a three-dimensional curvature.

The label can have a plurality of side tabs and rounded-off corner regions in which it is deformed in a deep-drawing like manner.

It is preferably envisaged that the film material has barrier properties in accordance with an intended use or in accordance with predetermined requirements, especially such that very substantial diffusion tightness is provided during sterilisation processes, i.e. at temperatures up to approx. 130° C.

The film material can, for example, be a metal or plastics film or a compound material, and it may have a SiOx or EVOH coating.

BRIEF DESCRIPTION OF THE DRAWINGS

The invention will now be described with reference to a working embodiment, in which reference is made to a drawing in which.

DETAILED DESCRIPTION OF THE INVENTION

Figure 1:
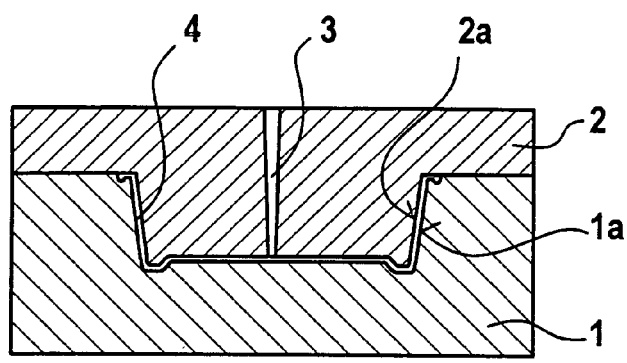
FIG. 1 shows a section view of an injection moulding die as part of an apparatus according to the invention, in its closed position.

FIG. 1 shows a section through an injection moulding die consisting of two parts for carrying out the method of the invention, which consists of a female mould 1 and a core 2 engaging in said female mould 1. The core 2 includes a sprue 3 leading into the mould cavity 4 which determines the shape of the plastic container to be manufactured. The space between the female mould and the core in the region of the mould cavity 4 corresponds to the thickness of the wall of the plastic container. The mould cavity 4 can be of any desired basic shape, i.e. it makes it possible to manufacture round, oval or polygonal plastic containers, or those of any other shape.

Figure 2:
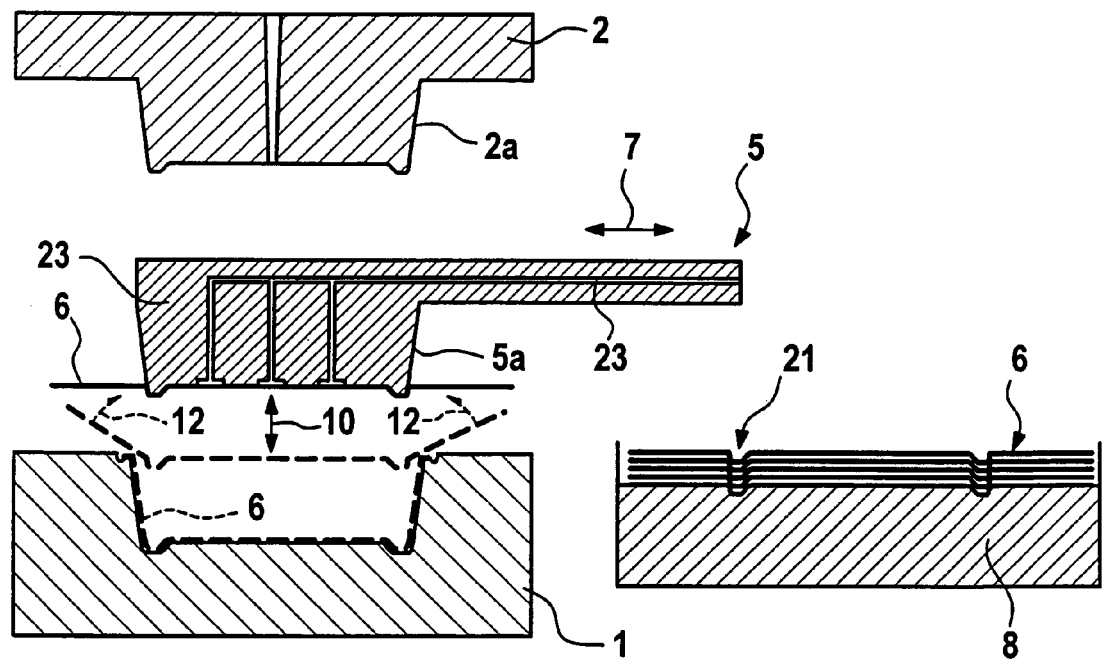
FIG. 2 shows the injection moulding die of FIG. 1 in its open condition, the manufacture of a label being shown in addition.
Figure 3:
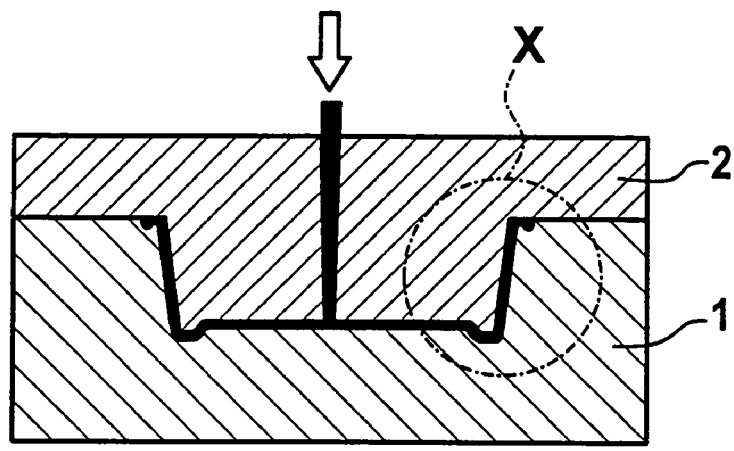
FIG. 3 shows the injection moulding die of FIG. 1 immediately after completion of an injection moulding process.

FIG. 2 shows the injection moulding die 1, 2 of FIG. 1 in the separated condition, a preforming core 5 being shown in addition, the task of which consists in receiving a label 6, which has been cut out of a piece of film material and is still substantially planar, from a feeder means 8 and in co-operating with the female mould 1 to convert said label into a desired shape corresponding to the outer surface of the plastic container to be manufactured. The preforming core can be moved, for this purpose, in a horizontal direction (arrow 7) and in a vertical direction (arrow 10). While the outer surface 2a of the core 2 co-operates with an inner surface 1a of the female mould 1 to form said mould cavity 4, an outer surface 5a of said preforming core 5 is larger than said outer surface 2a, so that, when the preforming core and the female mould move together, only a gap is left, which essentially corresponds to a thickness of said film material (or approximately to twice the thickness thereof) from which said label has been produced, so that it is possible to preshape said label precisely. Instead of being preformed in said female mould 1, said label can be preformed in a separate preforming die (not shown).

Figure 5:
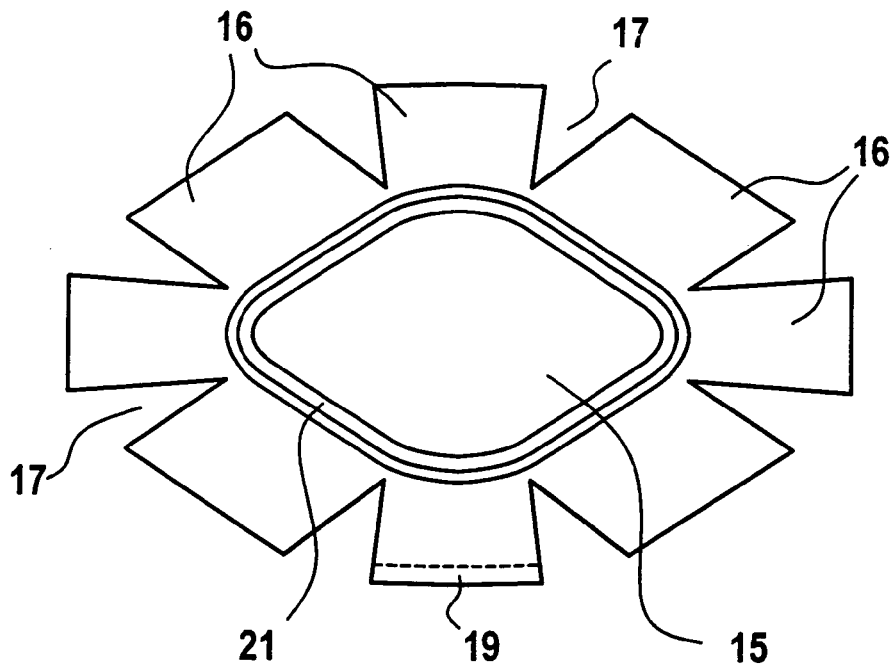
FIG. 5 shows a perspective view of a label according to the invention in a planar initial state.
Figure 6:
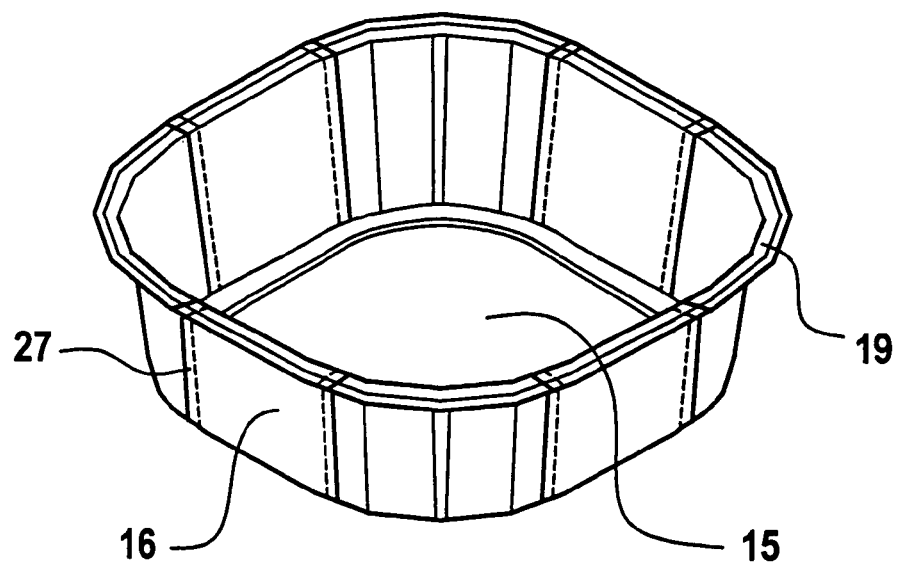
FIG. 6 shows a perspective view of the label of FIG. 5 in the form of a film material element in the completely formed and sealed state.

FIG. 5 shows a label cut or punched out of a planar piece of film material, which has a base portion or bottom portion 15 that corresponds to the bottom portion of the plastic container to be manufactured and which can in principle be shaped in any way desired, e.g. square, rectangular, round, oval, polygonal, with rounded corners, etc. Extending radially or outwardly from the bottom portion 15 are a plurality of side tabs 16, the (radial) length of which corresponds to the height of a portion of the side wall of the plastic container to be manufactured plus the width of a horizontal sealing or reinforcing rim (indicated by 19). The width of said side tabs (in a circumferential direction) or the size of the recesses 17 separating them is selected such that adjacent lateral rims of adjacent side tabs 16 each overlap in an overlapping region 27 when said label has been given its three-dimensional shape (FIG. 6). This ensures that the entire outer surface (base portion and side walls) of the plastic container to be manufactured is covered in a diffusion-tight manner, without their being any defects left, such as untidy abutting portions of adjacent edges of side tabs or injection points.

In the embodiment shown, the label 6 has an embossed or deep-drawn profile 21 running round it in the outer section of the bottom portion 15, which improves the stability of shape of the plastic container to be manufactured.

The individual process steps of the method according to the invention for manufacturing a diffusion-tight plastic container will now be described with reference to FIGS. 2 to 6. The preforming core 5 removes a top label 6 from the feeder means 8 (stack of labels 6), said label being held tight by means of a partial vacuum which is provided via lines 23 on a bottom surface of said preforming core corresponding to the bottom portion of said label. The label is raised slightly and moved to the left as shown by arrow 7 in FIG. 2, in which position it is located above the female mould 1 and aligned with the latter. After that, the preforming core 5 is lowered (arrow 10), the side tabs 16 of the label 6 first being bent upwards (arrows 12) until the side tabs 16 are resting over their entire surface against the inner surface 1a of the female mould 1. In the process, adjacent edges of adjacent side tabs 16 overlap at overlapping regions 27 (FIG. 6). At said overlapping regions 27, the film material of said label 6 is sealed, i.e. by melting or by bonding with a suitable adhesive, which can be done either inside said female mould 1 (e.g. by means of corresponding heating elements in said female mould and/ or on said preforming core 5) or after the preformed label has been moved out of said female mould 1.

In addition, it is envisaged according to the invention that the label should, at least in some portions, i.e. especially in the region of the transition between the base portion and the side tabs, should be deformed in a deep-drawn manner, or stretched, so that the label is adapted to a rounded shape of the outer surface of the plastic container. In the process, the label is given, at least in some regions, a three-dimensional curvature corresponding to the outer surface of the plastic container, in other words curvature in which the film material of the label is curved in every direction. The deformation of the label in the manner of deep-drawing can in principle be performed at any stage in the course of manufacturing the label, or already proceeding from the substantially planar shape shown in FIG. 5, or alternatively in the course of shaping by the preforming core 5. Alternatively, the deep-drawing deformation might only occur when the overlapping regions 27 have already been sealed. Finally, it can be provided that a label which has not yet been deformed in a deep-drawing manner is placed in the mould cavity and is only deformed by the plastics injected.

The described method of manufacturing a label from a precut blank with radial tabs has an advantage over a method in which the label as a whole is manufactured by deep-drawing from a planar precut blank, in that the degree of plastic deformation of the tabs, in the manner of deep-drawing, is less, so that less expensive film materials can be used, which will moreover also exhibit greater diffusion-tightness in the preformed regions, since they will have been stretched less.

Figure 4:
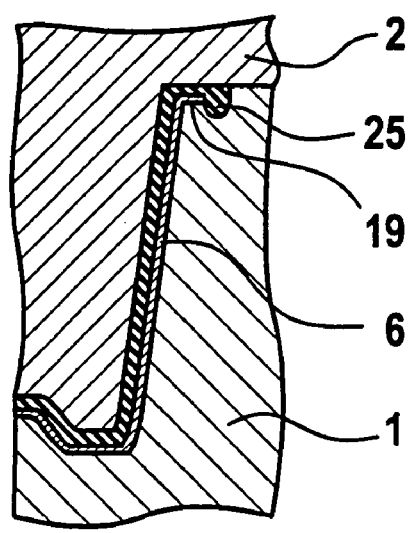
FIG. 4 shows a detail from FIG. 3 on an enlarged scale.

As FIG. 4 shows, the outer edges of the side tabs 16 are folded over horizontally outwards in order to form a sealing edge 19 which is coated with a reinforcing bead 25 during the injection process. The sealing edge 19 serves to seal the plastic container with a diffusion-tight sealing film (lid film) after it has been filled with a desired product, thus enabling the product to be sealed in diffusion-tight over all. This is assisted by the fact that the plastics material is delivered through a sprue 3 facing the inside of the plastic container 3, so that even the base portion of the label is made diffusion-tight with no interruption.

What is claimed is:

1. An injection moulding method for manufacturing a diffusion-tight plastic container with a bottom portion and a side wall portion, comprising the steps of:
   a) providing a planar, diffusion-tight film material,
   b) cutting a label out of the film material, the precut label having a bottom portion corresponding to the bottom portion of the plastic container and a plurality of side tabs extending from it, the side tabs corresponding to the side wall portion of the plastic container,
   c) providing a preforming core having an outer surface that conforms to an outer surface of the plastic container, wherein the preforming core is configured to provide for a first space between a female mould and the preforming core that corresponds to at least the thickness of the film material,
   d) shaping the label with the preforming core and the female mould such that the space provided between them allows the label to conform to the outer surface of the plastic container, whereby adjacent edges of the adjacent side tabs form overlapping areas and the region of transition between the bottom portion and the side tabs is stretched to form a three-dimensional curvature corresponding to the outer surface of the plastic container,
   e) sealing the film material at the overlapping areas,
   f) placing the preshaped and sealed label into an injection mould having a female mould and a separate core in which a second space exists between the female mould and the core wherein the space corresponds to the thickness of the wall of the plastic container to be manufactured,
   g) closing the mould, whereby the space between the female mould and separate core is formed, and
   h) injecting plastics material into the mould cavity and manufacturing the plastic container, wherein the three-dimensional curvature of the label conforms to the outer surface of the plastic container and the label is bonded to the plastics material and forms the outer surface of the plastic container.

2. A method according to claim 1, wherein the corner regions are rounded off.

3. A method according to claim 1, wherein a circumferential sealing edge is formed on the plastic container.

4. A method according to claim 3, wherein the sealing edge is provided with a marginal, plastic bead.

5. The method according to claim 1, wherein the bottom portion includes an embossed profile positioned around an outer section of the bottom portion.

6. The method according to claim 1, wherein the preforming core removes the precut labels from a feeder means and moves the label to a position above a female mould.

7. The method according to claim 1, wherein the overlapping regions of the film material are sealed by melting or by bonding with an adhesive.

8. The method of claim 1, wherein the space between the female mould and the preforming core is about twice the thickness of the film material.

* * * * *